United States Patent [19]

Kirk

[11] Patent Number: 5,523,104
[45] Date of Patent: Jun. 4, 1996

[54] METHOD OF COOKING PIZZA

[76] Inventor: Alan J. E. Kirk, R.D. #2, Box 533D, Rte. 982, Mt. Pleasant, Pa. 15666

[21] Appl. No.: 157,889

[22] Filed: Nov. 24, 1993

[51] Int. Cl.$^6$ .................................................. A23L 1/00
[52] U.S. Cl. .............................. 426/523; 99/401; 99/447
[58] Field of Search ........................... 426/523, 520; 99/447, 401; 219/438

[56] References Cited

U.S. PATENT DOCUMENTS

| | | | |
|---|---|---|---|
| 3,098,918 | 7/1963 | Roci et al. | 99/331 |
| 3,474,725 | 10/1969 | McClaren | 99/447 |
| 3,987,719 | 10/1976 | Kian | 99/422 |
| 4,184,421 | 1/1980 | Ahlgren | 99/DIG. 15 |
| 4,332,188 | 6/1982 | Rhear | 99/447 |
| 4,367,243 | 1/1983 | Brummett et al. | 99/DIG. 15 |
| 4,498,376 | 2/1985 | Carey | 99/422 |
| 4,636,618 | 1/1987 | Jenicot | 219/438 |
| 4,955,125 | 9/1990 | Steinman | 99/DIG. 15 |
| 5,078,050 | 1/1992 | Smith | 99/DIG. 15 |

Primary Examiner—George Yeung
Attorney, Agent, or Firm—Daniel J. Long

[57] ABSTRACT

There is disclosed an apparatus for cooking pizza which comprises (a) a pan element having a base floor and peripheral walls extending upwardly therefrom; (b) a plate element superimposed over and spaced above the base floor section of the pan element; (c) a preferably domed shaped lid element superimposed over the pan element and having an interior reflective surface; and (d) means for applying heat to said apparatus. A method of using this apparatus is also disclosed.

10 Claims, 2 Drawing Sheets

5,523,104

METHOD OF COOKING PIZZA

BACKGROUND OF THE INVENTION

1. Field of the Invention

The present invention relates to cooking utensils and more particularly to apparatus for cooking pizza.

2. Brief Description of the Prior Art

Over the last forty years pizza has become an increasingly popular food item both in the United States and in many other parts of the world. It is now widely consumed, and it is reported that annual yearly consumption in the United States now exceeds one billion pounds.

Nutritionally, pizza has many advantages since its taste is widely popular and, in a single food item, it can provide many necessary nutrients, including complex carbohydrates, vegetables, milk products and proteins. Another advantage of pizza is that it may also be prepared from relatively low cost ingredients.

Notwithstanding the relatively low cost of its ingredients, the cost of pizza to the consumer is often relatively high since a significant proportion of pizza consumed is prepared in commercial establishments. Such commercial establishments generally prepare pizza in large relatively high temperature pizza ovens.

Pizza can also be prepared, generally at a lower cost than the commercial product, in generally lower temperature home kitchen ovens, but many persons consider pizza prepared in this way to be inferior in quality to the commercially available product. It is found, for example, that pizzas prepared in home ovens are often excessively dried out and overcooked on their sides and undercooked on their insides. Furthermore, when pizza is prepared in a home kitchen it is necessary that an entire oven be heated and then generally allowed to cool in order to prepare a single pizza. In commercial establishments, on the other hand, pizza is usually prepared on a relatively continuous basis so that the repeated heating and cooling of an oven is not required. Home preparation of the pizza may, therefore, be considered relatively energy inefficient.

In view of the above, it is the object of the present invention to provide an apparatus and method for preparing pizza which produces pizza which is at least comparable in quality to the commercially available product. It is a further object of the present invention to provide an energy efficient apparatus and method for preparing pizza in the home.

SUMMARY OF THE INVENTION

In the apparatus and method of the present invention, an uncooked or partially cooked pizza shell having a topping of tomato sauce, cheese and, optionally, other vegetables and meats is placed on a plate element within a shallow pan having a disc shaped base section and a peripheral wall. This plate element is spaced above the base of the pan and at the base of the pan there is a heating element. The plate element has a plurality of spaced transverse perforations, and superimposed above the plate element there is a domed lid element with an interior concave reflecting surface. The pizza placed on the plate element is cooked inside the closed vessel at a temperature of from about 350° F. to 400° F. for approximately 20 minutes to 30 minutes. The curve of the interior concave reflecting surface is selected so that heat is reflected downwardly so as be relatively evenly distributed over the top surface of the pizza. Surprisingly and unexpectantly, it is found that high quality pizza is produced at temperatures lower than those that are commonly used in commercial pizza ovens and at relatively low levels of energy consumption. The apparatus may also contain multiple plate and cover combinations which may be advantageously used, for example, in small restaurants that do no specialize in serving pizza. In such units, cooking time may be decreased to about 15 to 20 minutes by increasing temperatures to about 450° F. to 500° F.

BRIEF DESCRIPTION OF THE DRAWINGS

The apparatus and method of the present invention is further described with reference to the attached drawings in which.

DETAILED DESCRIPTION

Figure 1:
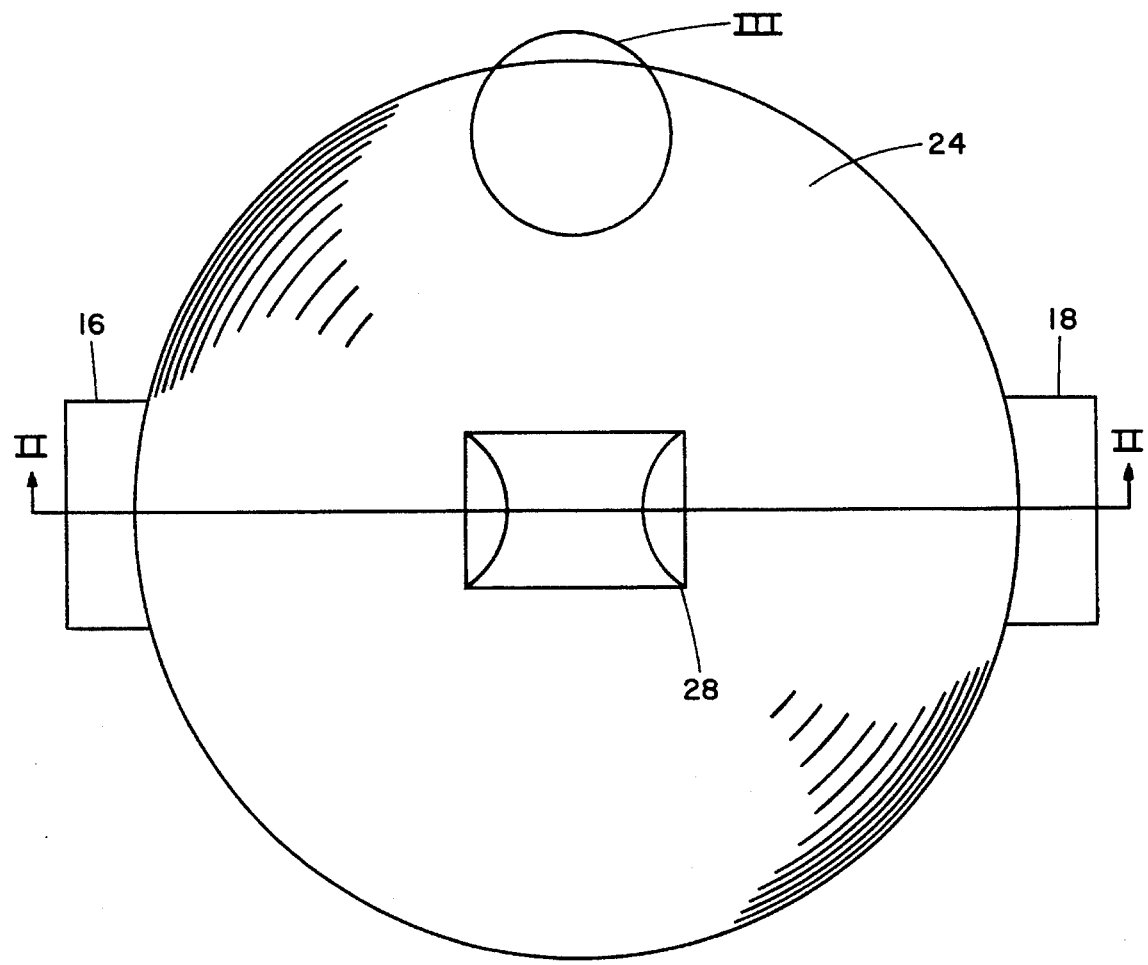
FIG. 1 is a plan view of a preferred embodiment of the pizza cooking apparatus of the present invention.
Figure 2:
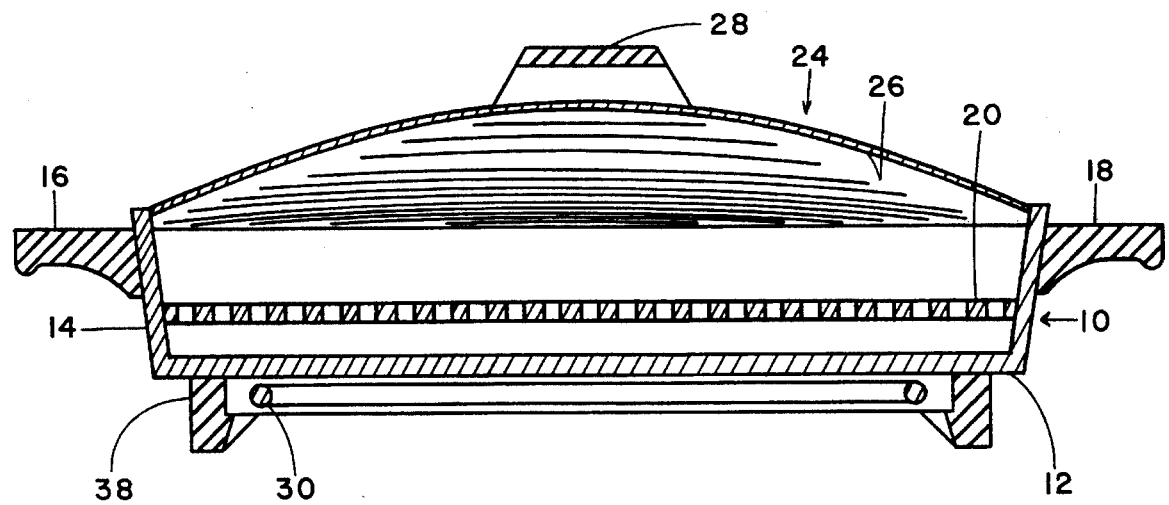
FIG. 2 is a cross sectional view at line II—II of the pizza cooking apparatus shown in FIG. 1.
Figure 3:
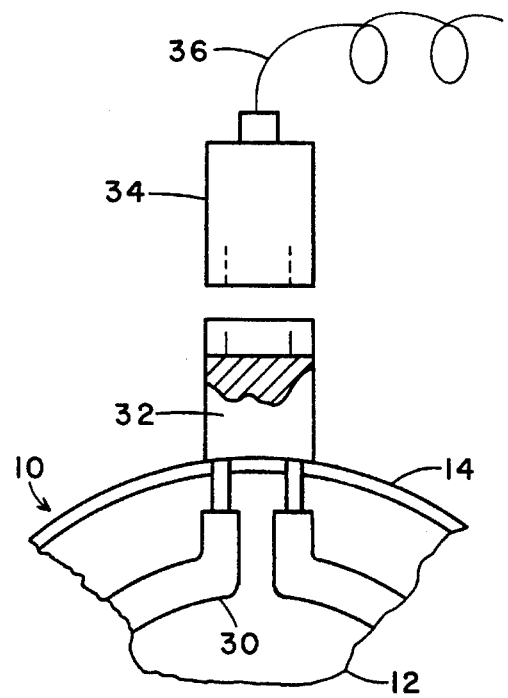
FIG. 3 is a detailed cut away view of the area in circle III of FIG. 1.
Figure 4:
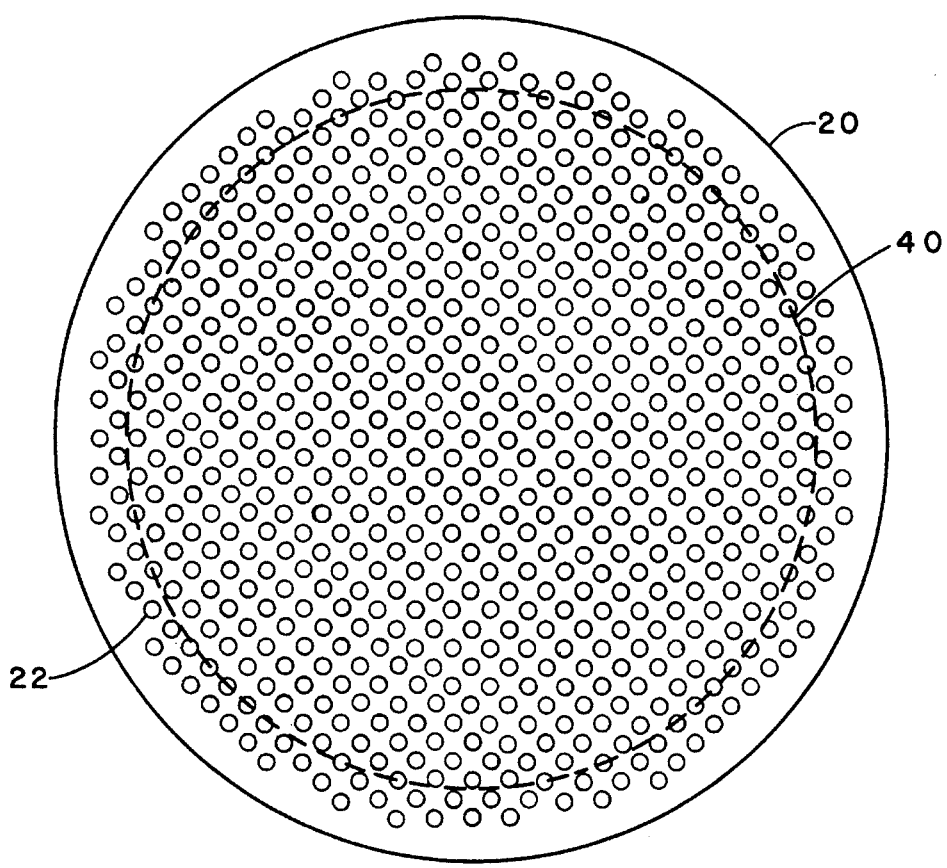
FIG. 4 is a plan view of the plate element shown in FIG. 1.

Referring to the drawings, the pizza cooking apparatus includes a pan element which is shown generally at numeral 10. This pan element includes a base section 12 and a wall section 14 which projects upwardly from the periphery of the base section. Handles 16 and 18 extend outwardly from opposite ends of the wall section. Superimposed above the base section of the pan element there is a plate element 20 on which a pizza to be cooked (not shown) is placed. Referring particularly to FIG. 4, it will be seen that this plate element has over its entire surface a plurality of regularly spaced perforations as at 22 which extend transversely from its top side to its bottom. Preferably, these perforations are about ¼ inch in diameter and are spaced edge to edge from adjacent perforations by about ¼ inch. Resting on the upper terminal lid of the wall section of the plate element, there is a removable domed lid shown generally at numeral 24. The inner surface of this lid is concave (with respect to the pan) reflective surface 26. On its top side there is a handle 28. Referring particularly to FIG. 2, there is an electric heating element 30 adjacent to the base of the pan and the plate element. This heating element is circular in shape and it is positioned in a generally spaced, concentric arrangement inside the wall section of the pan element. Referring particularly to FIG. 3, the heating element is connected to a two-pronged round receptacle 32 which is itself connected to a 120 volt AC power supply with a standard two-prong female adaptor plug 34 which is connected to a cable 36. Referring again to FIG. 2, it will be seen that the entire apparatus rests on a support 38.

Preferably the apparatus will be configured to be large enough to accommodate most sizes of pizza but to be small enough to be energy efficient and to develop the good cooking characteristics available with it. The pan is believed to be most effective when it is from about 15 to 16 inches in diameter and is relatively shallow so that the wall section will be from about ¾ to 1 inches in height. The height of the domed lid from its top to the bottom of the pan is preferably about 2½ to 3 inches. The curve of this domed lid is also selected so that heat emitted upwardly from the heating element will be reflected downwardly toward the pizza on the plate element so that the reflected heat is relatively uniformly distributed on the top surface of the pizza in place thereon when that pizza is held within a central retaining area on the plate as, for example, is shown in the broken line at 40 on FIG. 4. Preferably this surface would have a reflective efficiency above 50 percent. For the size apparatus described above, the heating element would preferably have capacity of from about 1200 to 1500 watts so as to generate ambient air temperatures inside the vessel of from about 300° F. to 350° F.

Those skilled in the art will also appreciate that the pizza cooker described herein may be enlarged for commercial uses such as in fast food and other restaurants that do not specialize in serving pizza. It is contemplated that such commercial devices would have two to four separate plates and lid combination of the kind described above. In order to accommodate the quicker service needs often required in a commercial setting, pizza cooking times may be decreased to about 15 to 20 minutes by increasing cooking temperatures to about 450° F. to 500° F. The heating element for such a commercial device would preferably have a capacity of 2500 watts.

The method of cooking pizza in the apparatus of the present invention is further described with reference to the following examples. In those examples which pertain to the apparatus of the present invention, the pan element had a diameter of 15.5 inches, the peripheral wall section was 0.75 inches in height, the top of the domed lid was 3 inches above the base of the pan. The plate element was 15.375 inches in diameter and had perforations being a 0.25 inch in diameter and being spaced from adjacent perforations by 0.125 inches. The curve on the lid was selected so that heat would be relatively uniformly reflected onto the top surface of pizzas placed on the plate (when centrally emplaced in the central retaining area of the plate) when pizzas of a diameter of 15 inches or less were used. In this case, the slope of a line above the horizontal that was tangent to the curve of the lid one-quarter of the way above the edge of the lid toward the top of the lid was 22°, the slope of a line one-half of the way above the edge of the lid was 15° and the slope of the line three-quarters of the way above the edge was 8°. The lid was 1/16 inch in thickness and its inside surface was stainless steel polished to be reflective, having a reflective efficiency estimated to be about 70 percent. The pan and plate elements were constructed of aluminum alloy being about a 1/16 inch in thickness. The plate element was positioned 1/4 inch above the base of the pan, and a 1500 watt capacity heating element was positioned beneath the base and interposed approximately half way between the base of the pan and the plate.

EXAMPLE I

A refrigerated commercially available partially cooked pizza crust being about 15 inches in diameter and weighing about 7 ounces with a topping of about 4 ounces of tomato sauce and about 6 ounces of cheese was centrally positioned on the plate element of the above described apparatus. The heating element was energized to bring the temperature of ambient air inside the vessel to about 400° F. The pizza was then retained inside that vessel for 30 minutes. The pizza was then removed and its quality was evaluated as follows. Outside of crust: golden brown; inside of crust: moist and fully cooked; topping: fully cooked.

EXAMPLE II

A refrigerated commercially available partially cooked deep dish curst being about 14 inches in diameter and weighing about 8 ounces with a topping of about 7 ounces tomato sauce, 6 ounces of cheese and 7 ounces of a mixture of meat and vegetables. The pizza was then cooked as described in Example I at about 400° F. for about 30 minutes and the quality was evaluated with the same results as being obtained in Example I again being obtained.

Although the invention has been described with a certain degree of particularity, it is to be understood that the present disclosure has been made only as an example and that the scope of the invention has been only as an example and that the scope of the invention has been defined by what is hereafter claimed.

What is claimed is:

1. A method of cooking pizza comprising the steps of:
    (a) positioning a partially cooked or uncooked pizza having a bottom surface and a top surface covered with a tomato sauce and cheese topping in a pan element having a wall section peripherally extending toward a concave reflective surface such that said pizza is interposed between a heat source located generally adjacent to the wall section of the pan element and the concave reflective surface; and
    (b) energizing the heat source and allowing the pizza to be cooked in an ambient air temperature of from about 350° F. to about 500° F. for from about 15 minutes to about 30 minutes by application of heat applied directly from the heat source and indirectly from the reflective surface such that said heat from said reflective surface is reflected over the top surface of the pizza.

2. The method of claim 1 wherein the pizza is retained within a closed cooking vessel.

3. The method of claim 2 wherein the top tomato sauce and cheese covered surface is oriented toward the concave reflective surface.

4. The method of claim 3 wherein the pizza is cooked in an ambient air temperature of from about 350° F. to about 400° F. for from about 20 minutes to about 30 minutes.

5. The method of claim 4 wherein the pizza is cooked in a ambient air temperature of from about 450° F. to about 500° F. for from about 15 minutes to about 20 minutes.

6. The method of claim 5 wherein the bottom surface of the pizza rests on a perforated metal plate.

7. The method of claim 6 wherein the top surface of the pizza is spaced from the upper reflective surface at a distance of from about 2 inches to about 2¾ inches and the bottom surface is spaced from the heat source at a distance of from about ¼ inches to about ⅜ inches.

8. The method of claim 7 wherein the heat source is an electrical heating element having a capacity of from about 1200 watts to about 1500 watts.

9. The method of claim 1 wherein the heat source is an electrical heat source positioned in spaced, concentric arrangement with the wall section of the pan element.

10. The method of claim 1 wherein heat from the reflective surface is reflected approximately uniformly over the top surface of the pizza.

* * * * *